United States Patent
Desai et al.

(10) Patent No.: US 9,495,264 B2
(45) Date of Patent: Nov. 15, 2016

(54) DATA REPLICATION TECHNIQUES USING INCREMENTAL CHECKPOINTS

(75) Inventors: Samir Desai, Maharashtra (IN); Niranjan Pendharkar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 502 days.

(21) Appl. No.: 12/853,234

(22) Filed: Aug. 9, 2010

(65) Prior Publication Data

US 2012/0036106 A1 Feb. 9, 2012

(51) Int. Cl.
  *G06F 17/00* (2006.01)
  *G06F 11/20* (2006.01)
  *G06F 17/30* (2006.01)
  *G06F 11/14* (2006.01)

(52) U.S. Cl.
  CPC ....... *G06F 11/2097* (2013.01); *G06F 11/1451* (2013.01); *G06F 11/2094* (2013.01); *G06F 17/30212* (2013.01); *G06F 17/30575* (2013.01); *G06F 2201/84* (2013.01)

(58) Field of Classification Search
  CPC .............. G06F 11/1471; G06F 11/1469; G06F 17/30067; G06F 11/203; G06F 12/0815; G06F 11/1658; G06F 11/2023; G06F 11/3608
  See application file for complete search history.

(56) References Cited

U.S. PATENT DOCUMENTS

| | | | |
|---|---|---|---|
| 5,163,148 A * | 11/1992 | Walls ............................ | 711/162 |
| 7,222,133 B1 * | 5/2007 | Raipurkar ........... | G06F 11/1458 |
| | | | 707/642 |
| 7,266,574 B1 * | 9/2007 | Boudrie et al. ............... | 707/646 |
| 7,836,267 B1 * | 11/2010 | Cross ............................. | 711/162 |
| 2005/0108292 A1 * | 5/2005 | Burton et al. ................. | 707/200 |
| 2008/0177994 A1 * | 7/2008 | Mayer ................... | G06F 9/4418 |
| | | | 713/2 |
| 2009/0006496 A1 * | 1/2009 | Shoens et al. ................. | 707/203 |
| 2010/0049930 A1 * | 2/2010 | Pershin et al. ................ | 711/162 |

OTHER PUBLICATIONS

"Bakup," Wikipedia.com, pp. 1-11, Jul. 19, 2010.
"Incremental Backup," Wikipedia.com, pp. 1-3, Jun. 10, 2010.
"Snapshot (computer storage)," Wikipedia.com, pp. 1-3, Jun. 17, 2010.

(Continued)

*Primary Examiner* — Angelica Ruiz
(74) *Attorney, Agent, or Firm* — Wilmer Cutler Pickering Hale and Dorr LLP

(57) ABSTRACT

Incremental checkpoint, for use in data replication, track the changes made to a file system after a point in time at which the incremental checkpoint is created. Data replication techniques using the incremental checkpoints may include taking a regular checkpoint of the file system and creating the first time full copy on remote node using the regular checkpoint. Changes made to the file system are then tracked in an incremental checkpoint that are stored on the remote node. The processes of taking the incremental checkpoint and storing the incremental checkpoint are iteratively performed. The first time fully copy and the incremental checkpoints may then be used for data replication, backup, continuous data protection (CDP), or the like.

20 Claims, 9 Drawing Sheets

(56) References Cited

OTHER PUBLICATIONS

"Continuous Data Protection," Wikipedia.com, pp. 1-2, Jun. 11, 2010.
"File System," Wikipedia.com, pp. 1-12, Jun. 25, 2010.
"Network File System (protocol)," Wikipedia.com, pp. 1-6, Jun. 24, 2010.
"Distributed Filed System," Wikipedia.com, pp. 1-3, Jun. 25, 2010.
"Clustered File System," Wikipedia.com, p. 1-3, May 31, 2010.
"Network-attached Storage," Wikipedia.com, p. 1-5, Jun. 10, 2010.

* cited by examiner

DATA REPLICATION TECHNIQUES USING INCREMENTAL CHECKPOINTS

BACKGROUND OF THE INVENTION

Information drives business, education, government and the like. Individuals, companies, institutions and other entities rely to an unprecedented extent upon online, frequently accessed, constantly changing data. Events that inhibit the availability and accuracy of such data may have negative consequences for such entities. Replication, backup and continuous data protection techniques are utilized to minimize data loss and improve the availability of data. In the event of a failure of one or more physical disks for storing data, or failure of a node or host data processing system associated with such a disk, the data on a remote node may not be utilized.

Data storage is typically allocated from one or more storage devices that are maintained as a "volume." The "volume" may serve as a logical interface used by an operating system to access data stored on one or more storage media using a single instance of a file system. Thus, a volume may act as an abstraction that essentially "hides" storage allocation and (optionally) data protection and/or redundancy from the application. An application can store its data on multiple volumes. The content of a volume is accessed using fixed sized data units called blocks. Replication may be implemented at the file level or the block level.

Periodic replication is an important feature of file store solutions. A snapshot or checkpoint operation is often used to avoid downtime. In Veritas File System (VxFS), a checkpoint mechanism is used to track changes and to provide stable copy for reading the same. However, performing a replication operation, backup operation, or the like on a large data set may take a significant amount of time to complete. When replicating using checkpoints, the file system is locked, so that other accesses to the system are blocked, to make a copy for use in generating the checkpoint. Each conventional checkpoint is a copy of the entire file system. The replication is then implemented by comparing two checkpoints to determine the difference between the two. The difference is then copied to the remote node. In addition, the read-copy-modify cycle used for writes to a file system impact the performance on the server which is being replicated. In particular, for every write on the file system, a read of the file system and a write to the backup has to be performed for all files in the file system being modified at the time. The write is performed twice if the file system is also using the checkpoints to track the changes. If checkpoints are not used to track changes, then either the whole file system is scanned to track the changes or fetch command load overhead is incurred. If the increments at block level (BLIB) are taken, then the checkpointing overhead is incurred all the time. Accordingly, there is a continuing need for improved data replication techniques.

SUMMARY OF THE INVENTION

The present technology may best be understood by referring to the following description and accompanying drawings.

Embodiments of the present technology are directed toward data replication techniques utilizing incremental checkpoints. In one embodiment, data replication methods include receiving input/output requests to a file system on a primary node, and making changes to the file system on the primary node in response to corresponding input/output requests. The method also includes mirroring the changes made to the file system, substantially as the changes are made to the file system, in an incremental checkpoint after a point in time at which the incremental checkpoint is created, and storing the incremental checkpoint on a remote node.

In one embodiment, a regular checkpoint of the file system on the primary node is taken and stored as a first full copy on the remote node. Thereafter, incremental checkpoints of the file system are iteratively taken and stored on the remote node on a predetermined interval. During the iterative process, the changes to the file system are paused while switching from the current incremental checkpoint to a new incremental checkpoint.

In one embodiment, the first full copy created using the regular checkpoint is retrieved from the remote node. Each successive incremental checkpoint is also retrieved from the remote node. A replication copy is then created by applying the changes in each successive incremental checkpoint to the first fully copy.

In one embodiment, the incremental checkpoints mirror changes to files and metadata of the file system from a point of creation of the current incremental checkpoint to a point of creation of the new incremental checkpoint.

In one embodiment, the incremental checkpoints mirror overlays to the non-written data on the original file data.

In one embodiment, the incremental checkpoints comprise block level snapshots. In another embodiment, the incremental checkpoints comprise file level snapshots.

In one embodiment, the present technology is implemented as one or more computing device readable media having computing device executable instructions which when executed perform a method that includes receiving input/output requests to a file system on a primary node and making changes to the file system on the primary node in response to corresponding input/output requests. The changes made to the file system are mirrored in an incremental checkpoint, substantially as the changes are made to the file system, after a point in time at which the incremental checkpoint is created. The incremental checkpoint may then be stored on a remote node.

In one embodiment, the present technology is implemented as a storage system including one or more processors coupled to one or more computing device readable storage media and executing computing device readable code which implements one or more modules. The one or more modules receive input/output request to a file system on a primary node and make changes to the file system in response to corresponding input/output requests. The changes are mirrored in an incremental checkpoint, substantially as the changes are made to the file system, after a point in time at which the incremental checkpoint is created. The incremental checkpoint may then be stored on a remote node.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present technology, as defined solely by the claims, will become apparent in the non-limiting detailed description set forth below.

BRIEF DESCRIPTION OF THE DRAWINGS

Embodiments of the present technology are illustrated by way of example and not by way of limitation, in the figures

DETAILED DESCRIPTION OF THE INVENTION

Figure 1:
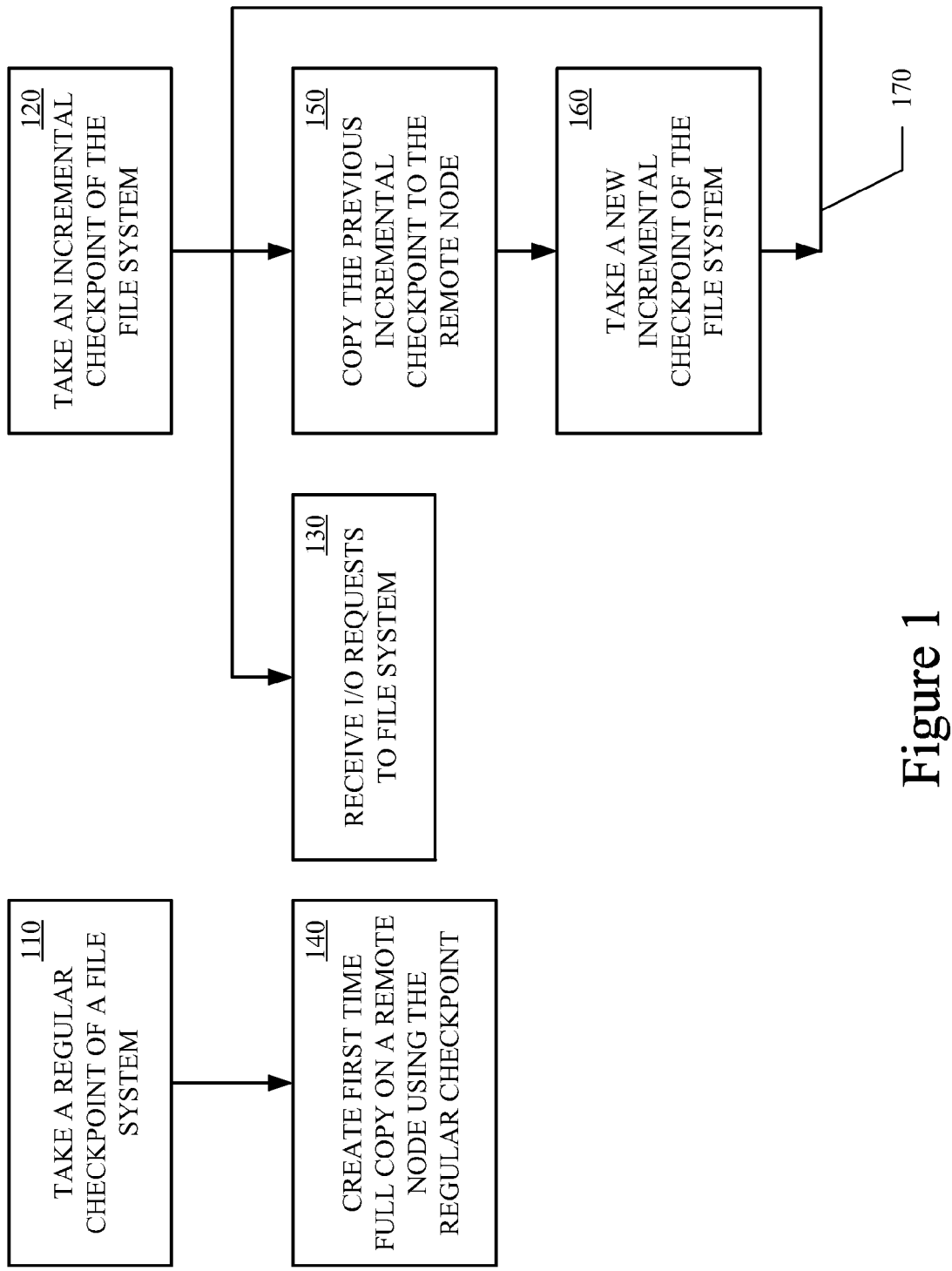
FIG. 1 shows a flow diagram of an incremental checkpoint method, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In addition, the use of the disjunctive is intended to include the conjunctive. The use of definite or indefinite articles is not intended to indicate cardinality. In particular, a reference to "the" object or "a" object is intended to also denote one of a possible plurality of such objects.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Referring to FIG. 1, an incremental checkpoint method, in accordance with one embodiment of the present technology, is shown. The incremental checkpoints track changes made to a file system after a point in time at which the incremental checkpoint is created. Although specific operations are disclosed, such operations are examples. The method may not include all the operation illustrated by FIG. 1. Also, the method may include various other operations and/or variations of the operations shown by FIG. 1. Likewise, the sequence of the operations can be modified. It is appreciated that not all of the operation may be performed.

In various embodiments, one or more of the operations of the incremental checkpointing method can be controlled or managed by software, by firmware, by hardware, or by any combination thereof, but is not limited to such. The method can include processes of embodiments which can be controlled or managed by one or more processors and electrical components under the control of logic circuits and/or computing device readable and executable instructions (e.g., code or software). The computing device readable and executable instruction may reside, for example, in computing device readable media such as volatile memory, non-volatile memory, mass storage, or the like.

The method may begin with taking a regular checkpoint of a file system, at 110. In one implementation, the file system is stored on a primary node. The regular checkpoint includes a full copy of the file system on a file store. At 120, an incremental checkpoint of the file system is also taken. The incremental checkpoint includes the incremental changes to files and/or directories in the file system. The changes may include adding files, deleting files, modifying files, moving files within directories, adding directories, deleting directories, modifying directories, changing access permission for files and/or directories, changing metadata of the file and/or file system, and/or the like.

In one implementation, the regular checkpoint and the first incremental checkpoint may be taken at substantially the same time. For example, the regular checkpoint and first incremental checkpoint may be performed in one command.

After the regular checkpoint is taken, various input/output requests to the file system may be processed, at 130. The incremental checkpoint mirrors the various input/output request to the file system from the point of creation of the current incremental checkpoint to the point in time when a new incremental checkpoint is taken on top of the current incremental checkpoint. For example, if a file or directory is created, the file or directory is also written to the incremental checkpoint. If a file or directory is modified, the modified file or directory is also written to the incremental checkpoint.

At 140, a first time full copy of the file system is created on a remote node using the regular checkpoint. At 150, the previous incremental checkpoint is copied to the remote node. During a first pass, the previous incremental checkpoint is the first incremental checkpoint. The incremental checkpoint may be copied to the remote node to provide a history of the different points in the file system. In another implementation, the incremental checkpoint may be applied to the full copy of the file system to provide an updated full copy of the file system.

At 160, a new incremental checkpoint of the file system is taken. The mirror style copy utilized for the incremental checkpoints does not force a data read from disk and can happen in parallel to the write to the original block. When a new incremental checkpoint is taken, the current incremental checkpoint stops accumulating the changes to the file system and becomes the previous incremental checkpoint. In one implementation, the previous checkpoint is discarded after it is copied to the remote node.

In one implementation, writes to the file in the file system are frozen until the mirroring of files switches from the current incremental checkpoint to the new incremental checkpoint to make sure that the changes to the file system are flushed to the current incremental checkpoint. The freeze may be implemented by temporarily halting the threads of input/output requests to the file system so that they cannot enter the file system process. After the writes that are in flight during the interval of the first incremental checkpoint are made to the file system and mirrored in the current incremental checkpoint, the threads of the halted input/output requests are enabled again. In a cluster file system, a protocol across the set of node of the file system may provide for halting the writes on all the nodes.

In one embodiment, multiple changes to the same file or directory are merged into one change when they occur during a given incremental checkpoint. In contrast, conventional techniques, such as a log of changes, will not provide a similar benefit of merging the changes into a single change when they occur during the interval of a given checkpoint.

In one embodiment, the first time full copy of the file system is created and the incremental checkpoints are copied from the file system on the primary node to the same file system on the remote node. In another embodiment, the first time full copy of the file system is created and the incremental checkpoints are copied from the file system on the primary node to a different file system on the remote node.

Each incremental checkpoint is taken for a specified interval. In one implementation, the specified interval may be a predetermined time period. In another implementation, the specified interval may be a predetermined number of changes to the file system. In such case, the interval of the incremental checkpoint may be proportional to the rate of changes to the file system.

In one implementation, the incremental checkpoints may be block level snapshots of the changes to the file system. In another implementation, the incremental checkpoints may be file level snapshots of the changes to the file system. The incremental checkpoint mirrors all the non-written data on the original file data, though that is useful until the incremental checkpoint is the topmost checkpoint. Overlays on metadata, like the inode list file, can be used for faster checkpoint creation, similar to conventional checkpoints.

At 170, copying the previous incremental checkpoint to the file system and taking a new incremental checkpoint is iteratively repeated. Therefore, a plurality of incremental checkpoints are created, wherein each incremental checkpoint includes the changes to the file system for the corresponding interval of the incremental checkpoint. Furthermore, the overhead of the incremental checkpoints is proportional to the changes to the file system.

Figure 2:
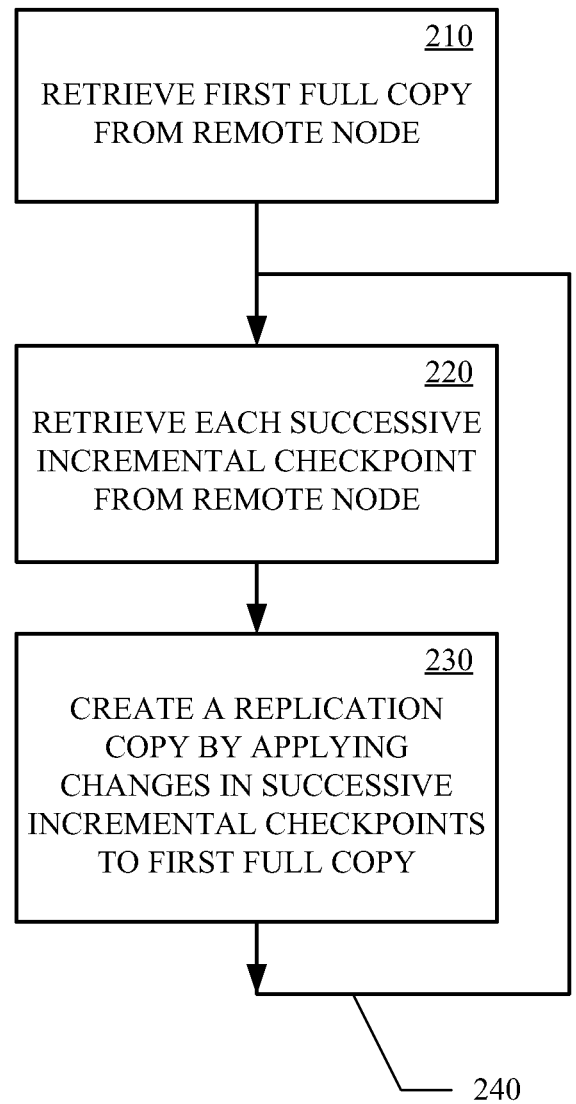
FIG. 2 shows a flow diagram of a data replication method using incremental checkpoints, in accordance with one embodiment of the present technology.

Referring now to FIG. 2, a data replication method using incremental checkpoints, in accordance with one embodiment of the present technology, is shown. Although specific operations are disclosed, such operations are examples. The method may not include all the operation illustrated by FIG. 2. Also, the method may include various other operations and/or variations of the operations shown by FIG. 2. Likewise, the sequence of the operations can be modified. It is appreciated that not all of the operation may be performed. In various embodiments, one or more of the operations of the data replication method using incremental checkpointing can be controlled or managed by software, by firmware, by hardware, or by any combination thereof, but is not limited to such. The method can include processes of embodiments which can be controlled or managed by logic circuits and/or one or more processors and electrical components under the control of computing device readable and executable instructions (e.g., code or software). The computing device readable and executable instruction may reside, for example, in computing device readable media such as volatile memory, non-volatile memory, mass storage, or the like.

The data replication method may begin with retrieving the first time full copy from the remote node at 210. At 220, each successive incremental checkpoint is retrieved from the remote node. Each incremental checkpoint includes the incremental changes to files and/or directories in the file system. The changes may include added files, deleted files, modified files, files moved within directories, added directories, deleted directories, modified directories, changes to access permission for files and/or directories, and/or the like. At 230, a replication copy is created by applying the changes in each successive incremental checkpoint to the first time full copy. At 240, the process of retrieving each successive incremental checkpoint and applying the changes to the fully copy is iteratively performed until a given state of the replication copy is obtained.

Figure 3:
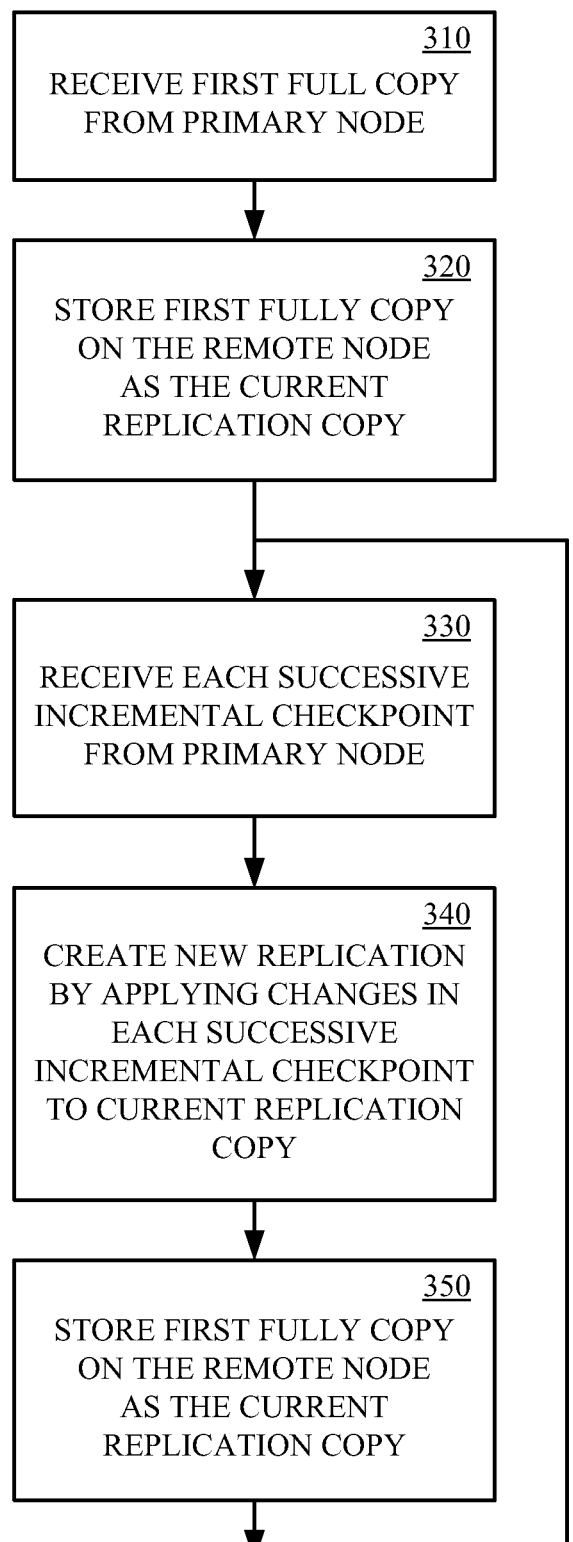
FIG. 3 shows a flow diagram of a data replication method using incremental checkpoints, in accordance with another embodiment of the present technology.

Referring now to FIG. 3, a data replication method using incremental checkpoints, in accordance with another embodiment of the present technology, is shown. Again, although specific operations are disclosed, such operations are examples. The method may not include all the operation illustrated by FIG. 3. Also, the method may include various other operations and/or variations of the operations shown by FIG. 3. Likewise, the sequence of the operations can be modified. It is appreciated that not all of the operation may be performed. In various embodiments, one or more of the operations of the data replication method using incremental checkpointing can be controlled or managed by software, by firmware, by hardware, or by any combination thereof, but is not limited to such. The method can include processes of embodiments which can be controller or managed by logic circuits and/or one or more processors and electrical components under the control of computing device readable and executable instructions (e.g., code or software). The computing device readable and executable instruction may reside, for example, in computing device readable media such as volatile memory, non-volatile memory, mass storage, or the like.

The data replication method may begin with receiving the first time full copy from the primary node, at 310. At 320, the full copy is stored on the remote node as the replication copy. At 330 each successive incremental checkpoint is received from the primary node. Each incremental checkpoint includes the incremental changes to files and/or directories in the file system. The changes may include added files, deleted files, modified files, files moved within directories, added directories, deleted directories, modified directories, changes to access permission for files and/or directories, and/or the like. At 340, a new replication copy is created by applying the changes in the incremental checkpoint to the replication copy. At 350, the new replication copy is stored on the remote node as the replication copy. At 360, the process of receiving each successive incremental checkpoint, applying the changes to the replication copy and storing the new replication copy is iteratively performed.

Figure 4:
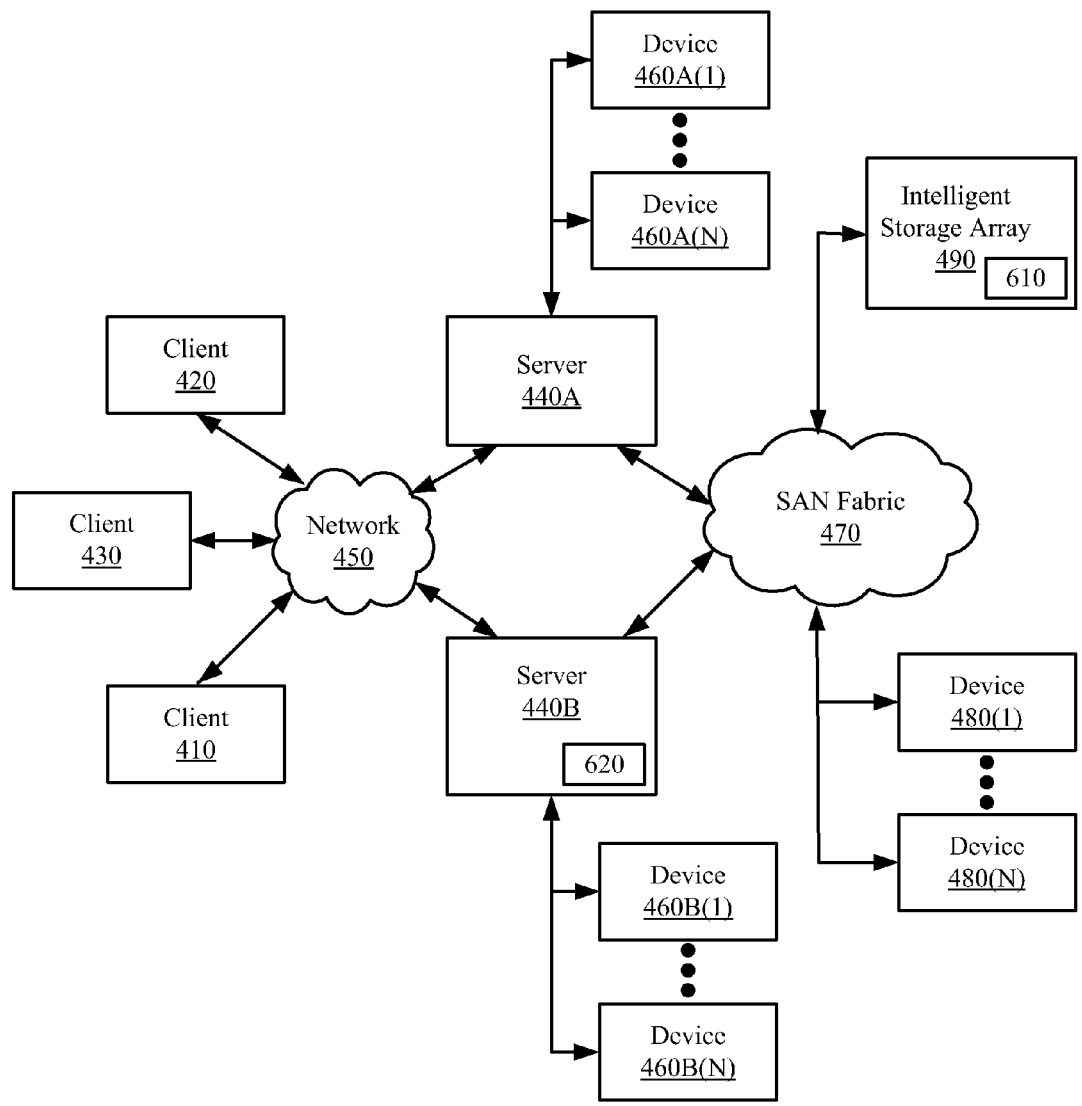
FIG. 4 shows a block diagram of an exemplary computing environment for implementing incremental checkpoints, in accordance with one embodiment of the present technology.

Referring to FIG. 4, an exemplary computing environment 400 for implementing incremental file system checkpoints, in accordance with one embodiment of the present technology, is shown. The incremental checkpointing may be utilized for periodic replication, backup, constant data protection (CDP), and/or the like, as further described with reference to FIGS. 5, 6 and 7. The computing environment may include one or more client systems 410-430, as well as storage servers 440A and 440B, coupled to a network 450. Storage server 440A is further depicted as having storage devices 460A(1)-(N) directly attached, and storage sever 440B is depicted with storage devices 460B(1)-(N) directly attached, as network attached storage (NAS). Storage servers 440A and 440B may also be connected to a storage area network (SAN) fabric 470, although connection to a SAN is not required for operation of embodiments of the present technology. SAN fabric 470 supports access to storage devices 480(1)-(N) by storage servers 440A and 440B, and so by client systems 410, 420 and 430 via network 450. Intelligent storage array 490 is also shown as an example of a specific storage device accessible via SAN fabric 470.

Generally, NAS provides both storage and a file system. NAS is a file-based storage. In contrast, SAN generally provides block-based storage and the corresponding file system is provided by a server. However, it is also possible to combine SAN and NAS to provide both file-level and block-level access for the same system.

Client systems 410, 420 and 430 are able to access information on storage server 440A and 440B using, for example, a web browser or other client application (not shown). Such a client allows client systems 410, 420 and 430 to access data hosted by storage server 440A or 440B or one of storage devices 460A(1)-(N), 460B(1)-(N), 480(1)-(N), or intelligent storage array 490. In addition, one or more of the clients, one or more servers and/or one or more of the storage devices may be distributed in a cloud computing environment.

FIG. 4 depicts the use of a network, such as the Internet, for exchanging data, but the present disclosure is not limited to the Internet or any particular network-based environment. Many other devices or subsystems (not shown) may be connected in a similar manner.

Figure 5:
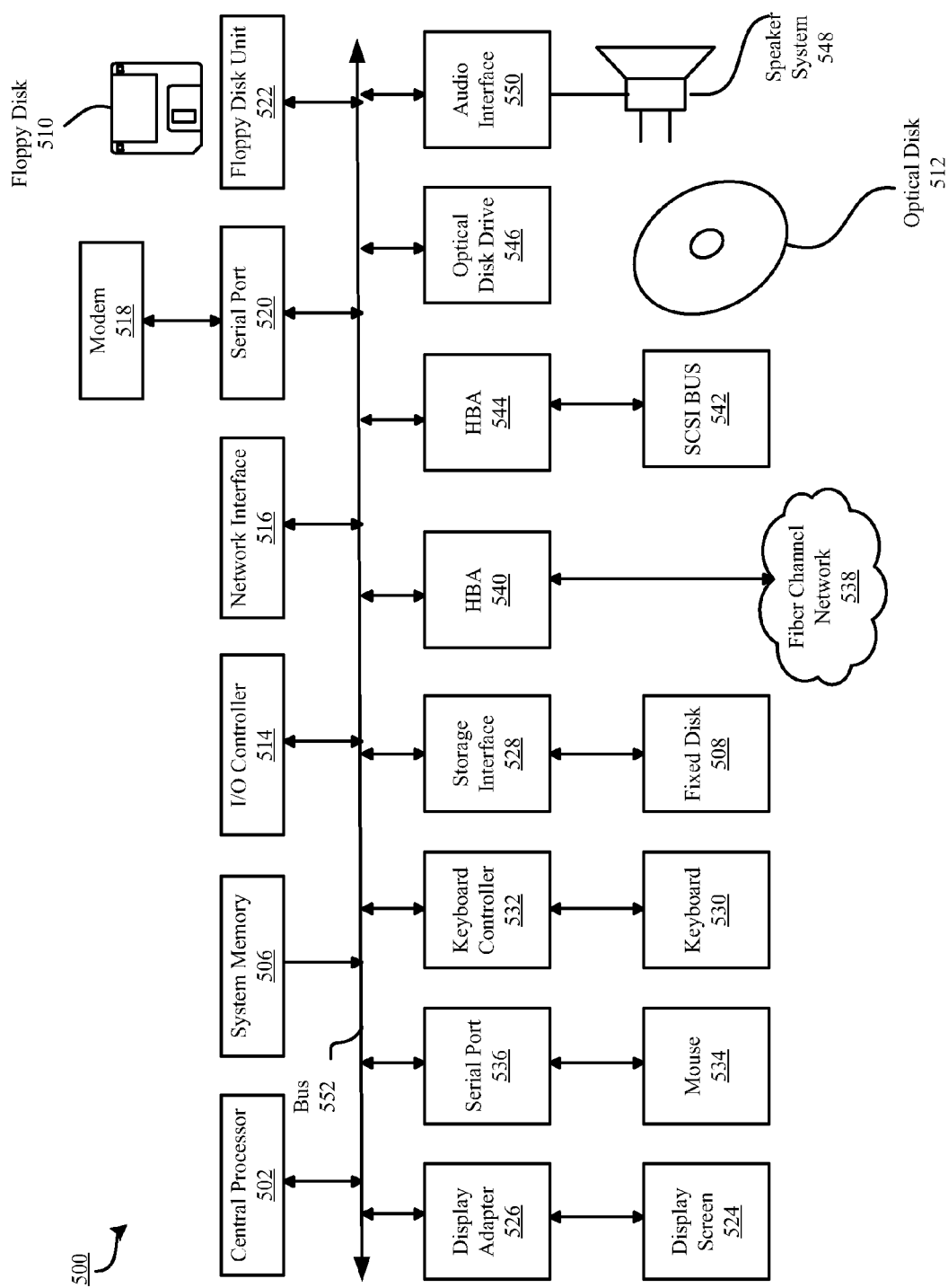
FIG. 5 shows a block diagram of an exemplary computing device suitable for implementing incremental checkpoints, in accordance with one embodiment of the present technology.

Referring now to FIG. 5, an exemplary computing device 500 suitable for implementing incremental checkpoints on the exemplary computing environment 400, in accordance with one embodiment of the present technology, is shown. In one implementation, the computing device 500 may be utilized to implement SAN, NAS, servers, and/or client computing devices. The computing device 500 may include one or more processors 502, one or more computing device readable media 506-512, and one or more input/output devices 514-536, 544-550.

In one implementation, the computing device includes a central processing unit (CPU) 502, a system memory 506 (typically RAM, but which may also include ROM, flash RAM, and/or the like), and an input output controller hub 514. The input/output controller hub 514 provides for communication between the CPU 502, the system memory 506 and input/output devices such as a network interface 516, a modem 518 via a serial port interface 520, a floppy disk drive 522, a display 524 via a display adapter 526, one or more fixed disks (e.g., hard disk drive (HDD)) 508, disk arrays or the like via a storage interface 528, a keyboard 530 via a keyboard controller 532, a mouse 534 via a serial port 536, a fiber channel network 538 via a host bus adapter (HBA) 540, an SCSI bus 542 via an HBA 544, an optical disk drive 546, an speaker 548 via an audio interface 550, and/or the like. The one or more processors 502, one or more computing device readable media 504-512, and one or more input/output devices 514-550 are communicatively coupled together by one or more buses 552.

The modem 518 may provide a connection to a remote server or client via a telephone link or to the Internet via an internet service provide (ISP). The network interface 540 may provide a connection to a remote server or client via a network link 538 to the Internet via a POP (point of presence). The network interface may provide such connection using wired or wireless techniques, including digital cellular telephone connection, Cellular Digital Packet Data (CDPD) connection, digital satellite data connection or the like.

Again, many other devices or subsystems (not shown) may be connected in a similar manner (e.g., printer, document scanners, digital cameras, and so on). Conversely, all of the devices shown in FIGS. 4 and/or 5 need not be present to practice the present technology. The devices and subsystems can also be interconnected in different ways from that shown in FIGS. 4 and 5. The operation of a computer system, such as that shown in FIGS. 4 and 5, are readily known in the art and is not discussed in detail in the application. Code to implement the present technology can be stored in computer-readable storage media such as one or more of system memory 504, fixed disk 506-508, optical disk 512, or floppy disk 510. The operating system provided on the computer device may be MS-DOS®, MS-Windows®, OS/2®, Unix®, Linux®, or another known operating system.

It should further be noted, that the computer system 400 can have some, most, or all of its functionality supplanted by a distributed computer system having a large number of dispersed computing nodes, such as would be the case where the functionality of the computer system 400 is partly or wholly executed using a cloud computing environment.

Moreover, regarding the file system data and checkpoints described herein, those skilled in the art will recognize that file system data and checkpoints can be directly transmitted as a signal from a first block to a second block, or a signal can be modified (e.g., amplified, attenuated, delayed, latched, buffered, inverted, filtered, or otherwise modified) between the blocks of the computing device and/or computing environment. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the file system data and checkpoints.

Figure 6:
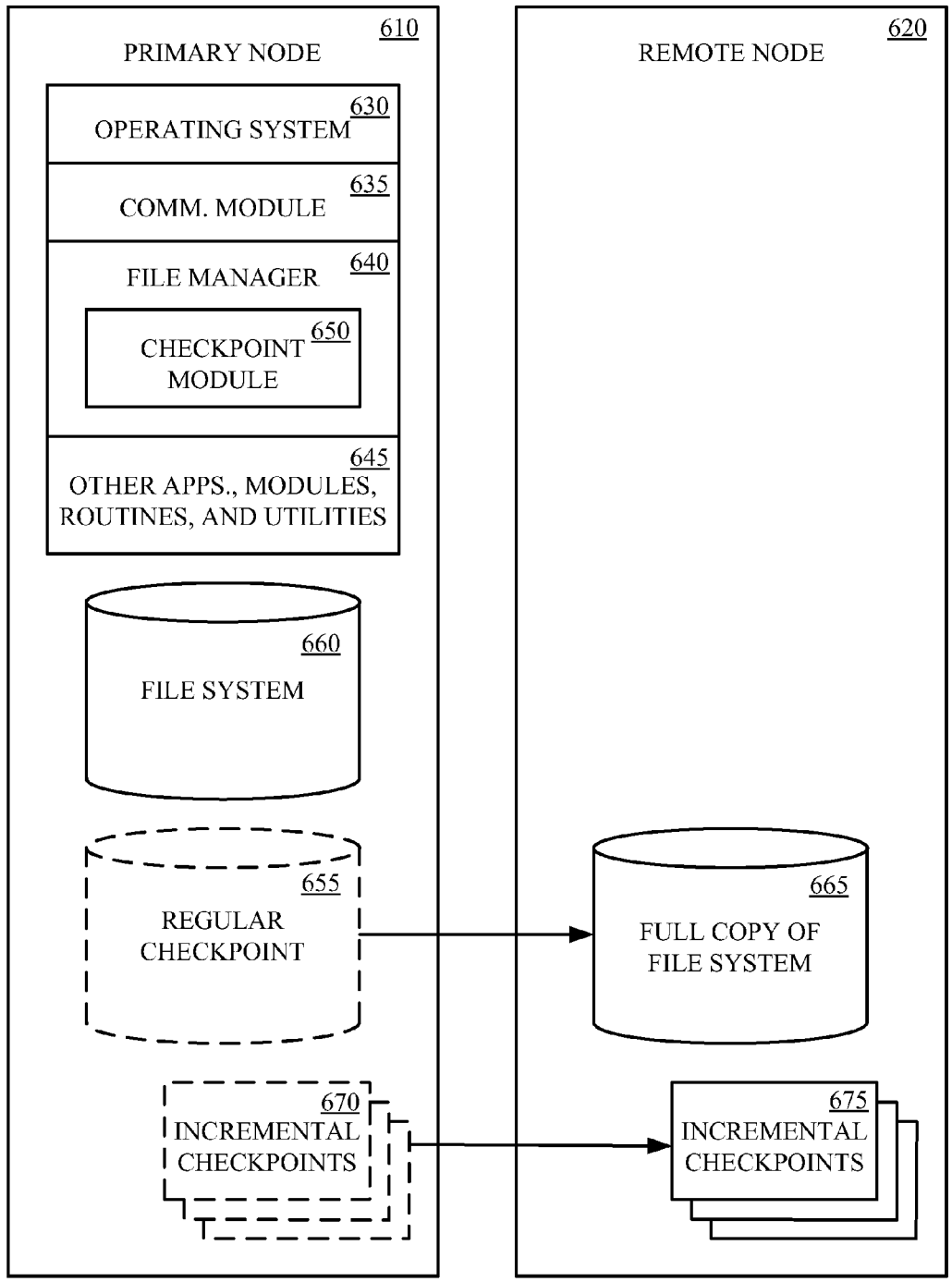
FIG. 6 shows a block diagram of a primary node and remote node of an exemplary storage system, according to one embodiment of the present technology.

Referring now to FIG. 6 a primary node and remote node of an exemplary storage system, according to one embodiment of the present technology, is shown. The primary node 610 and remote node 620 are implemented by one or more storage devices coupled by one or more networks as described with reference to FIG. 4. The primary node 610 includes one or more computing device readable media including computing device executable instructions of an operating system 630, a network communication module 635, a file manager 640, and other applications, modules, utilities, routines and the like 645. The following described applications modules, utilities, routines, and the like are only exemplary. Is it appreciated that the various applications, modules, utilities, routines, and the like may be combined together or separated into further applications, modules, routines, utilities and the like according to a particular embodiment.

On the primary node, the operating system 630 provides for controlling the execution of the applications, modules, routines and utilities, and the hardware portion of the computing device. The network communication module 645 provides for controlling communication over one or more network connections. The file manager 640 provide for the setup of one or more file systems and handling of input/output (I/O) request. The file system is a special-purpose database for the storage, organization, manipulation and retrieval of data. The file system may include a plurality of storage devices, a plurality of storage device partitions, a storage device array, or the like. In one implementation, the file manager may be Veritas File System (VxFS) or the like.

The remote node may also include an operating system, a network communication module, a file manager, and/or other applications, utilities, routine and the like. In other implementations, the operating system, network communication module, file manager, applications, modules, routines, utilities and/or the like of the primary node and/or the remote node may be implemented on another node such as a storage attached network (SAN).

Figure 7:
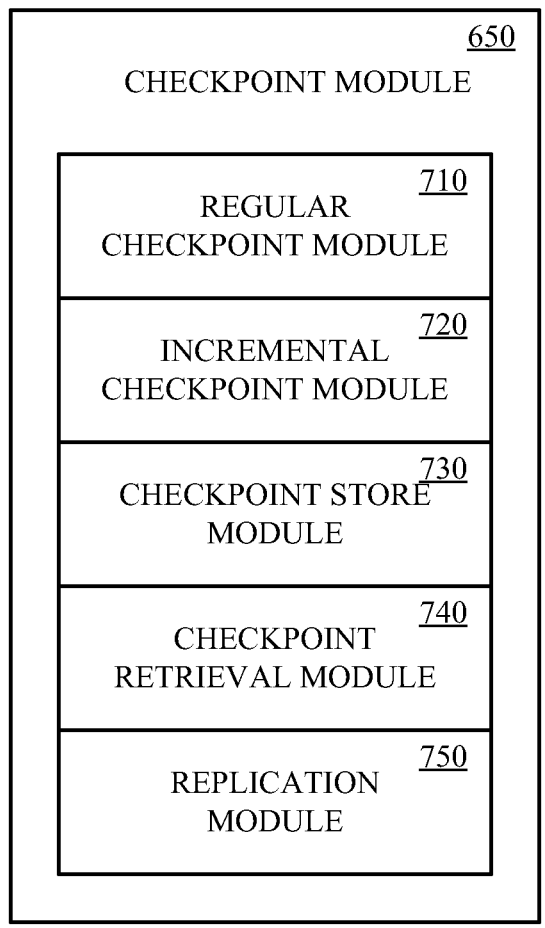
FIG. 7 shows a block diagram of a checkpoint module, in accordance with one embodiment of the present technology.

On the primary node, the file manager 640 includes a checkpoint module 650. Alternatively, the checkpoint module 650 or parts thereof may be implemented outside the file manager 640. Referring now to FIG. 7, a checkpoint module, in accordance with one embodiment of the present technology, is shown. The checkpoint module 650 includes a regular checkpoint module 710, an incremental checkpoint module 720, and a checkpoint store module 730. The regular checkpoint module 710 takes a regular checkpoint 655 of the file system 660. The regular checkpoint 655 includes a full copy of the file system 660. The regular checkpoint 655 may be taken at the block level or the file level. The checkpoint store module 730 saves the regular checkpoint 655 on the remote node 620 as a full copy of the file system 665.

The incremental checkpoint module 720 takes an incremental checkpoint 670 of the file system 660. The incremental checkpoint module 720 tracks all the changes made to the file system 660 after the point in time at which the current incremental checkpoint 670 is taken. In one implementation, the incremental checkpoint 670 mirrors all the changes to files and metadata happening to the file system from the point-in-time of creation of the incremental checkpoint to the point-in-time when another incremental checkpoint is taken on top of the current incremental checkpoint. The incremental checkpoint 670 overlays all the non-written data on the original file, data, although it is usefully until the incremental checkpoint is the topmost checkpoint. Overlays on metadata, such as the inode list file, can be used for faster checkpoint creation.

A new incremental checkpoint 670 is taken by the incremental checkpoint module 720 for each predetermined period. In one implementation the predetermined period is a specified period of time. In another implementation the predetermined period is a specified number of changes to the file systems, type of changes and/or need of the applications. In addition, the new incremental checkpoint ICP2 makes the previous incremental checkpoint ICP1 stable. The incremental checkpoints 670 may be tracked for input/output request on the file objects or storage blocks.

In one implementation, changes to the file in the file system are paused until the mirroring of files switches from the current incremental checkpoint to a new incremental checkpoint to make sure that the changes to the file system are flushed to the current incremental checkpoint. The incremental checkpoint module 270 may freeze the files by temporarily halting the threads of input/output requests to the file system so that they cannot enter the file system process. The input/output request may include adding files, deleting files, modifying files, moving files within directories, adding directories, deleting directories, modifying directories, changing access permission for files and/or directories, changing metadata of the file and/or file system, and/or the like. After the writes that are in flight during the interval of the first incremental checkpoint are made to the file system and mirrored in the current incremental checkpoint, incremental checkpoint module 270 switches to the new incremental checkpoint. The threads of the halted input/output requests are then enabled again by the incremental checkpoint module 270. In a cluster file system, a protocol across the set of node of the file system may provide for halting the writes on all the nodes.

The checkpoint store module 730 saves the incremental checkpoint 675 on the remote node 620. In one implementation, the incremental checkpoints 675 are stored on the remote node 620 using a mirror style copy that does not force a data read from the disk and therefore can happen in parallel with the write of the regular checkpoint. The replicated file system may be maintained in a continuously consistent state or a non-consistent state. Keeping the sequential log of the input/output request to the file system can be used for continuously consistent replication. Alternatively, a bit map based update-region map can be used for non-consistent state replication data.

In addition, the checkpoint module 650 may also include a checkpoint retrieval module 740 and a replication module 750. The checkpoint retrieval module 740 retrieves the full copy 665 from the remote node 620. The checkpoint retrieval module 740 also retrieves each successive incremental checkpoint 675 from the remote node 620. The replication module 750 creates a replication copy by applying changes in successive incremental checkpoints 675 to the full copy of the file system 665. The incremental file system checkpoint techniques can also be used for backup, continuous data protection (CDP), or the like.

Figure 8:
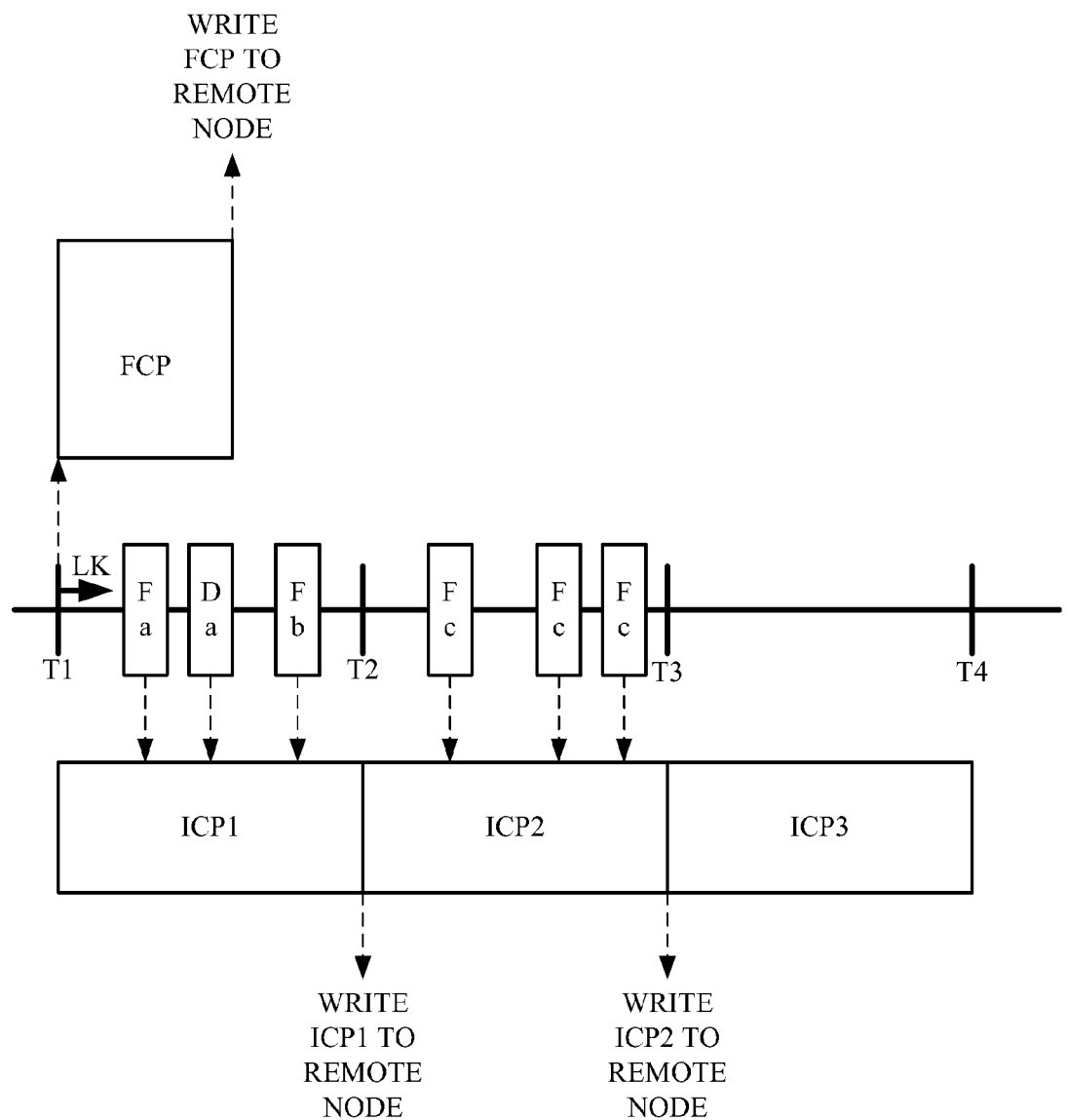
FIG. 8 shows a block diagram illustrating an exemplary operation of incremental checkpointing.

Referring now to FIG. 8, an exemplary operation of incremental checkpointing is illustrated. At an initial time T1, the file system is locked LK and the regular checkpoint module copies the entire file system, and the checkpoint store module writes the full checkpoint FCP to the remote node. If the file system includes one hundred files, the full checkpoint FCP would include a copy of the one hundred files. Starting at time T1 the incremental checkpoint module also begins to copy writes to the file system to a first incremental checkpoint ICP1. For example, if the file system receives a request to create a new file Fa, the file is written to the file system after the lock is released and the file is also written to the incremental checkpoint ICP1 by the incremental checkpoint module. A request to create a new directory Da will also be written to the file system and the incremental checkpoint ICP1 by the incremental checkpoint module. A request to modify file Fb will also be written to the file system and the incremental checkpoint ICP1 by the incremental checkpoint module. Accordingly, the first incremental checkpoint ICP1 tracks changes made to the files Fa, Fb and directories Da of the file system during the interval of the incremental checkpoint.

The full checkpoint FCP and the first incremental checkpoint ICP1 may be taken at substantially the same time. For example, the full checkpoint FCP and first incremental checkpoint ICP1 may be performed in one command. The mirror style copy utilized for the incremental checkpoints does not force a data read from disk and can happen in parallel to the write to the original block.

Just prior to a time T2, the file system is frozen by temporarily halting I/O request threads. Temporarily halting the I/O request threads allow the changes that are in flight to the file system to be made to the file system and to be mirrored in the first incremental checkpoint ICP1. At time T2 a new incremental checkpoint ICP2 is created by the incremental checkpoint module, and the previous incremental checkpoint ICP1 will be written to the remote node by the checkpoint store module. Writing the previous incremental checkpoint ICP1 does not involve a copy-on-write. Instead the previous incremental checkpoint ICP1 write can happen in parallel with writes to the file system. A first, second, and third request to modify file Fc occurring during the interval of second incremental checkpoint ICP2 will be written to the file system and to the incremental checkpoint ICP2 by the incremental checkpoint module. Again, the second incremental checkpoint ICP2 tracks changes made to the file Fc of the file system during the interval of the incremental checkpoint. In one implementation, the multiple changes to the file Fc are merged into one change because the three changes occurred during the interval of the second incremental checkpoint.

Just prior to a time T3, the file system is again frozen to allow the changes that are in flight to be made to the file system and mirrored in the second incremental checkpoint ICP2. When a third incremental checkpoint ICP3 is started, the second incremental checkpoint ICP2, including the merged changes to file Fc, are written to the remote node by the checkpoint store module. If merging of change to the file and directories is not desired, the interval of the incremental checkpoints may be reduced during setup to track the changes.

The overhead of the incremental checkpoints is therefore proportional to the changes to the file system. Furthermore, the interval of the incremental checkpoint may be a substantially constant period of time depending upon how much the remote node should lag behind the primary node. For example, the interval may be every five or ten minutes. Alternatively, the interval of the incremental checkpoints may vary. For example, the interval may be based upon a predetermined number of changes to the file system, the space available to record the changes for the incremental checkpoints, the type of changes such as over-write, the bandwidth of the communication link between the primary node and the remote node, and/or the like.

In addition, the full checkpoint and the incremental checkpoints may be copied from the file system on the primary node to the same file system on the remote node. In another embodiment, the full checkpoint and the incremental checkpoints are copied from the file system on the primary node to a different file system on the remote node.

Furthermore, the incremental checkpoints may be tracked for input/output requests on the file objects. Alternatively, the incremental checkpoints may be tracked for input/output requests on the storage blocks. Keeping a sequential log of the input/output requests can be used for continuous consistent replication. Alternatively, a bit-map based update-region map can be used for non-consistent state of replication data.

Figure 9:
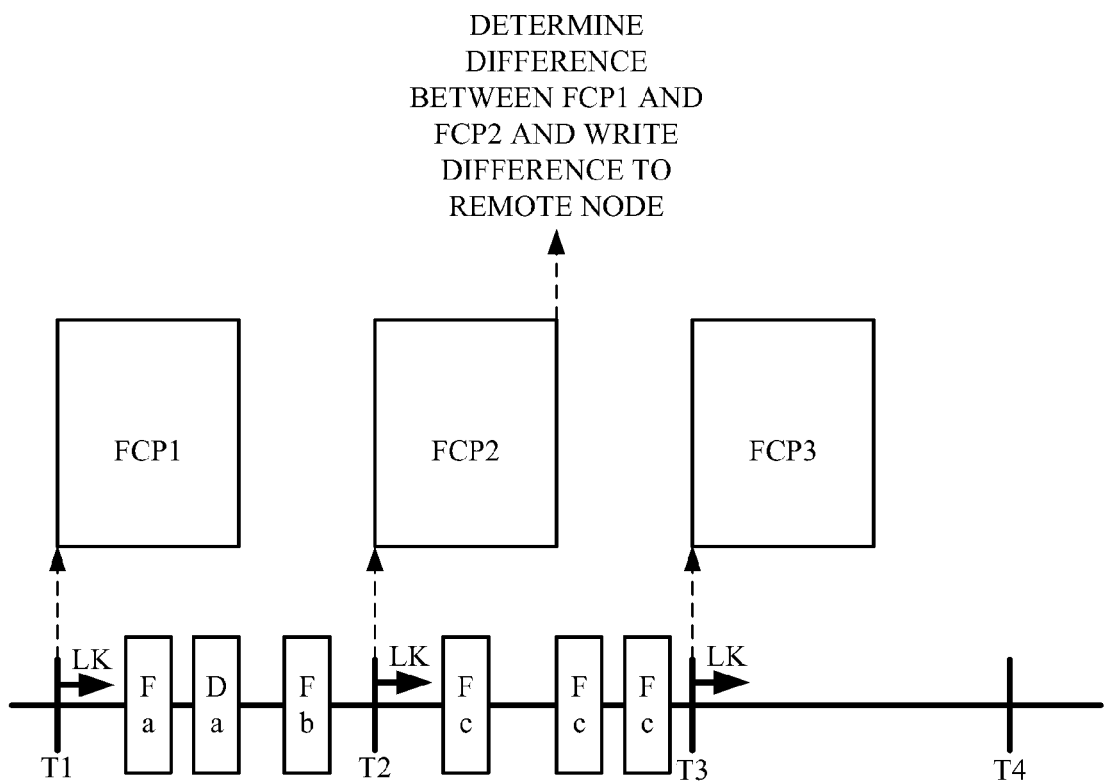
FIG. 9 shows a block diagram illustrating an exemplary operation of conventional checkpointing.

In contrast, FIG. 9 shows an exemplary operation of checkpointing according to the conventional art. At a time T1, the file system is locked and a copy of the file system is taken to create a first conventional checkpoint. After the first conventional checkpoint is created, the lock is released and any read or write requests are made to the file system. At time T2, the file system is again locked and a copy of the file system is taken to create a second conventional checkpoint. After the second conventional checkpoint is created, the lock is released and any read or write request is made to the file system. In addition, the difference between the first and second conventional checkpoints is determined and the difference is written to the remote node. Preserving the data in each checkpoint, repeatedly locking the file system, and repeatedly determining the difference between checkpoints adds considerable overhead to the conventional checkpoint technique.

Embodiments of the present invention provide a new paradigm of the checkpointing, in the form of an incremental checkpoint. Instead of preserving the old data in the checkpoint, only those changes to the file system are accumulated in the incremental checkpoints. Therefore, the overhead of the incremental checkpoint is proportional to the changes to the files system during the given checkpoint.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   starting generation of a full copy of a file system on a primary node at a first time, wherein the file system is locked while the full copy is generated;
   starting generation of an incremental checkpoint at substantially the first time;
   receiving input/output requests to the file system on the primary node;
   storing queued changes to the file system in a sequential log;
   unlocking and making changes to the file system on the primary node at a second time later than the first time in response to corresponding input/output requests;
   completing generation of the full copy at a third time concurrent with or later than the second time;
   storing the full copy on a remote node;
   completing generation of the incremental checkpoint after the third time, wherein the incremental checkpoint consists of changes to the file system stored in the sequential log;
   storing the incremental checkpoint on the remote node; and
   generating a replication copy of the file system by applying the changes in the incremental checkpoint to the full copy of the file system.

2. The method according to claim 1, further comprising:
   taking a regular checkpoint of the file system on the primary node;
   creating the first time full copy on the remote node using the regular checkpoint;
   taking the incremental checkpoint of the file system on the primary node; and
   iteratively repeating taking the incremental checkpoint and storing the incremental checkpoint on a predetermined interval, wherein changes to the file system are paused while switching from a current incremental checkpoint to a new incremental checkpoint.

3. The method according to claim 2, further comprising:
   retrieving the first time full copy from the remote node;
   retrieving each successive incremental checkpoint from the remote node; and
   creating the replication copy by applying changes in each successive incremental checkpoint to the first time full copy.

4. The method according to claim 1, wherein the incremental checkpoint mirrors changes to files and metadata of the file system from a point of creation of the current incremental checkpoint to a point of creation of the new incremental checkpoint.

5. The method according to claim 1, wherein the incremental checkpoint mirrors overlays to the non-written data on the original file data.

6. The method according to claim 1, wherein the incremental checkpoint comprises a block level snapshot.

7. The method according to claim 1, wherein the incremental checkpoint comprises a file level snapshot.

8. One or more non-transitory computing device readable media having computing device executable instructions which when executed perform a method comprising:
   starting generation of a full copy of a file system on a primary node at a first time, wherein the file system is locked while the full copy is generated;
   starting generation of an incremental checkpoint at substantially the first time;
   receiving input/output requests to the file system on the primary node;
   storing queued changes to the file system in a sequential log;
   unlocking and making changes to the file system on the primary node at a second time later than the first time in response to corresponding input/output requests;
   completing generation of the full copy at a third time concurrent with or later than the second time;
   storing the full copy on a remote node;
   completing generation of the incremental checkpoint after the third time, wherein the incremental checkpoint consists of changes to the file system stored in the sequential log;
   storing the incremental checkpoint on the remote node; and
   generating a replication copy of the file system by applying the changes in the incremental checkpoint to the full copy of the file system.

9. The one or more non-transitory computing device readable media having computing device executable instructions which when executed perform the method of claim 8, further comprising:
   taking a regular checkpoint of the file system on the primary node;
   creating the first time full copy on a remote node using the regular checkpoint;
   taking the incremental checkpoint of the file system on the primary node; and
   iteratively repeating taking the incremental checkpoint and storing the incremental checkpoint on a predetermined interval, wherein changes to the file system are paused while switching from a current incremental checkpoint to a new incremental checkpoint.

10. The one or more non-transitory computing device readable media having computing device executable instructions which when executed perform the method of claim 9, further comprising:
    retrieving the first time full copy from the remote node;
    retrieving each successive incremental checkpoint from the remote node; and
    creating the replication copy by applying changes in each successive incremental checkpoint to the first time full copy.

11. The one or more non-transitory computing device readable media having computing device executable instructions which when executed perform the method of claim 8, wherein the incremental checkpoint mirrors changes to files and metadata of the file system from a point of creation of the current incremental checkpoint to a point of creation of the new incremental checkpoint.

12. The one or more non-transitory computing device readable media having computing device executable instructions which when executed perform the method of claim 8, wherein the incremental checkpoint mirrors overlays the non-written data on the original file data.

13. The one or more non-transitory computing device readable media having computing device executable instructions which when executed perform the method of claim 8, wherein the incremental checkpoint comprises a block level snapshot.

14. The one or more non-transitory computing device readable media having computing device executable instructions which when executed perform the method of claim 8, wherein the incremental checkpoint comprises a file level snapshot.

15. A storage system comprising:
one or more processors coupled to one or more computing device readable storage media and executing computing device readable code which implement one or more modules, wherein the one or more modules:
  start generation of a full copy of a file system on a primary node at a first time, wherein the file system is locked while the full copy is generated;
  start generation of an incremental checkpoint at substantially the first time;
  receive input/output requests to the file system on the primary node;
  store queued changes to the file system in a sequential log;
  unlock and make changes to the file system on the primary node at a second time later than the first time in response to corresponding input/output requests;
  complete generation of the full copy at a third time concurrent with or later than the second time;
  store the full copy on a remote node;
  complete generation of the incremental checkpoint after the third time, wherein the incremental checkpoint consists of changes to the file system stored in the sequential log;
  store the incremental checkpoint on the remote node; and
  generate a replication copy of the file system by applying the changes in the incremental checkpoint to the full copy of the file system.

16. The storage system of claim 15, wherein the one or more modules:
  take a regular checkpoint of the file system on the primary node;
  create the first time full copy on remote node using the regular checkpoint;
  take the incremental checkpoint of the file system on the primary node; and
  iteratively repeat taking the incremental checkpoint and storing the incremental checkpoint on a predetermined interval, wherein changes to the file system are paused while switching from a current incremental checkpoint to a new incremental checkpoint.

17. The storage system of claim 16, wherein the one or more modules:
  retrieve the first time full copy from the remote node;
  retrieve each successive incremental checkpoint from the remote node; and
  create replication copy by applying changes in each successive incremental checkpoint to the first time full copy.

18. The storage system of claim 15, wherein the incremental checkpoint mirrors changes to files and metadata of the file system from a point of creation of the current incremental checkpoint to a point of creation of the new incremental checkpoint.

19. The storage system of claim 15, wherein the incremental checkpoint comprises a block level snapshot.

20. The storage system of claim 15, wherein the incremental checkpoint comprises a file level snapshot.

* * * * *